United States Patent
Grall

(10) Patent No.: US 11,578,854 B1
(45) Date of Patent: Feb. 14, 2023

(54) HIGH VISIBILITY TAPE

(71) Applicant: Terrand B. Grall, Plymouth, WI (US)

(72) Inventor: Terrand B. Grall, Plymouth, WI (US)

( * ) Notice: Subject to any disclaimer, the term of this patent is extended or adjusted under 35 U.S.C. 154(b) by 0 days.

(21) Appl. No.: 17/187,605

(22) Filed: Feb. 26, 2021

Related U.S. Application Data

(60) Provisional application No. 62/981,574, filed on Feb. 26, 2020.

(51) Int. Cl.
| | |
|---|---|
| *B32B 33/00* | (2006.01) |
| *F21V 7/28* | (2018.01) |
| *F21K 2/00* | (2006.01) |
| *E04F 11/104* | (2006.01) |
| *E04F 21/02* | (2006.01) |

(52) U.S. Cl.
CPC ............... *F21V 7/28* (2018.02); *B32B 33/00* (2013.01); *E04F 11/104* (2013.01); *E04F 21/02* (2013.01); *F21K 2/00* (2013.01); *B32B 2405/00* (2013.01); *E04F 2011/1046* (2013.01)

(58) Field of Classification Search
None
See application file for complete search history.

(56) References Cited

U.S. PATENT DOCUMENTS

| | | | |
|---|---|---|---|
| 5,904,017 A | 5/1999 | Glatz et al. | |
| 8,651,720 B2 | 2/2014 | Sherman et al. | |
| 9,135,794 B1 | 9/2015 | Anderson et al. | |
| 10,127,843 B2 | 11/2018 | Green | |
| 2004/0206294 A1* | 10/2004 | Cavanaugh | G09F 13/20 116/DIG. 14 |
| 2007/0077119 A1* | 4/2007 | Northey | E01F 9/578 404/12 |

FOREIGN PATENT DOCUMENTS

KR 101578250 3/2011

OTHER PUBLICATIONS

Orafol-Oralite VC104+Reflective Tape (Rigid Surfaces)—White/ 50mm wide ; Copyright 2016; https://sctegparts.com.au/CA7238-ORAFOL-3M-Diamond-Grade-Reflective-Tape-Rigid-White-50mm-45.7m-Roll-983 (Year: 2016).*
Brass Gold washi tape Morning Field Star Pattern mt; Review from Nov. 19, 2019; https://www.washitape.com/products/gold-morning-field-star-pattern-mt-washi-tape (Year: 2019).*
Reflective Hazard Tape, Checkered via Amazon; Date First Available Jul. 21, 2018; https://www.amazon.com/Reflective-checkered-reflective-Caution-2%E2%80%B3%C3%979-8%E2%80%B21/dp/B07FR91KGY (Year: 2018).*

(Continued)

*Primary Examiner* — Laura C Powers
(74) *Attorney, Agent, or Firm* — Mandy L. Tran; Ceres Patent & Technology, LLC

(57) ABSTRACT

The invention herein relates to a device and system for creating a consistent three-dimensional visual aid for traversing poorly lit or dark spaces by utilizing a device that creates multi-dimensional marking with an intuitive and consistent communicative pattern of marking design. The device further containing either self-illuminating material, light reflective material, or a combination of both.

4 Claims, 7 Drawing Sheets

(56) References Cited

OTHER PUBLICATIONS

3M Diamond Grade School Bus Marking Tape Flyer; copyright 2018; https://multimedia.3m.com/mws/media/520768O/3mtm-school-bus-markings-flyer.pdf (Year: 2018).*

3M TSD 2007 Conspicuity Custom Logo Tape Flyer; copyright 2019; https://multimedia.3m.eom/mws/media/1138600O/3m-diamond-grade-983-custom-logo-flyer.pdf (Year: 2019).*

Black and White Triangle Geo Pattern Washi Tape via Etsy; review from Jan. 22, 2017; https://www.etsy.com/listing/464081509/black-white-triangle-geo-pattern-washi?ga_order=most_relevant&ga_search_type=all&ga_view_type=gallery&ga_search_query=washi+tape+triangle+pattern&ref=sr_gallery-1-4&organic_search.*

Duck Brand Printed Duct Tape, Checker via Amazon, Question from Aug. 16, 2016, Review from Jul. 26, 2017; https://www.amazon.com/Duck-280410-Printed-Checker-Inches/dp/B0058DV71A?th=1 (Year: 2017).* https://www.u-buy.com.tw/en/product/1PX3EQ22-reflective-tape-waterproof-conspicuity-tape-visibility-hazard-caution-adhesive-tape-safety-signs-2-i avail Sep. 16, 2016 (Year: 2016).* https://www.amazon.ca/Reflective-Waterproof-Visibility-Industrial-Adhesive/dp/B07V5Y3988?th=1 Avail Oct. 29, 2019 (Year: 2019).* https://www.mathsisfun.com/definitions/parallelogram.html.*

U.S. Appl. No. 15/014,335, filed Jun. 2, 2016, Travis ThompsonBradley S. OrawAlexa.

* cited by examiner

HIGH VISIBILITY TAPE

CROSS REFERENCE TO RELATED APPLICATIONS

This nonprovisional utility patent application incorporates by reference in its entirety and claims benefit to provisional patent application No. 62/981,574, having the filing date of Feb. 26, 2020, pursuant to 35 U.S.C. § 119(e).

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark office, patent file or records, but otherwise reserves all copyright rights whatsoever.

BACKGROUND OF INVENTION

Field of the Invention

The present inventive subject matter relates to a device and system for marking and illuminating surfaces, specifically self-illuminating marking tape.

Background

Within the realms of safety enhancing devices are a variety of visual aid systems and tools. In areas that experience continual foot traffic where navigation may be a challenge, visual aids become important to the facilitation of safe movement. The conditions for movement along various pathways may be challenging for a variety of reasons. The cause may be from poor lighting, uneven surfaces, obstructions along the pathway, unfamiliar space, physical disabilities challenging the ability to see and move along a pathway, etc. The common issue however has to do with confused perception of the surrounding space. There exists devices and systems that attach to a variety of surfaces to provide enhanced visual guide. However, the existing prior art fails to be more universal in its application, effectiveness, and accessibility.

For example, U.S. patent application Ser. No. 15/014,335 relates to an ultra-thin display using a thin flexible LED light sheet. The LED display is printed onto a flexible sheet substrate with access to electrical charge. While the device may be attachable to many different types of surfaces, it is limited by the fact that electricity is required for its function. As such, the pattern of design will be limited and predetermined by manner of coupling and access to electricity. The functional requirement becomes a limiting factor on design, manufacture, and functional application.

U.S. Pat. No. 9,135,794 provides a modular emergency exit route illumination system and method. This device comprises an illumination guide attachable to key exit locations such as doors and windows and is connected to a sound system to provide verbal direction or cues to direct movement. Much like the above cited prior art, the disclosed technology in this case relies on available electric connection, which limits design, adaptability, and accessibility to the market at large.

U.S. Pat. No. 8,651,720 (continuation of South Korean Patent Application No. KR101578250) discloses a viscoelastic light guide that has prismatic reflective elements embedded therein for enhanced light reflection. The prismatic element may be oriented in different ways to direct the diffraction of light. The device may be embedded within flexible adhesive tape for use on any variety of surfaces for light reflection. The necessary requirement in this case however is the presence of light for reflection to occur. As such, the device is not meant to be used in nocturnal circumstances unless a light source is nearby for which this device would function to enhance the effect of said light source. The pattern design of the substrate bearing the patented invention of Patent No. '720 therefore becomes less relevant because its functionality would depend on the quality of light reflected off of any particular portion of the substrate. As such, an adhesive substrate containing these elements would lack independent functionality given the need for a light source, which will vary in quality.

U.S. Pat. No. 5,904,017 discloses a photo-luminescent emergency egress accessory in the form of combined and co-extruded non-luminescent and photo-luminescent material such that the luminescent material is embedded into solid accessory, and the accessory comprising surface moulding to be embedded into wall or floor surfaces in strategic manner. By design, this device is limited to use with surface covering designs (floor or wall panels) that are compatible in design to particular accessory moulding. As such, the device of this patent lacks universal adaptability to less conforming and less conventionally shaped surfaces.

U.S. patent Ser. No. 10/127,843 discloses a sign device comprising a mountable planar hard material wherein an adhesive film with photoluminescent material is printed thereon with graphical words or illustrations, such that the adhesive film is attached to the sign device to create a luminescent sign that does not require electrical connection for illumination. The patent in this case narrowly describes a system of mountable signage that contains self-illuminating graphics affixed thereon. Once again, the system fails to address nonconforming surfaces or needs.

There have been prior patents and disclosures that describe methods for forming a self-illuminating or photo-illuminating tape, both adhesive and non-adhesive forms. These patents relate solely to the product produced by the method or process of manufacture but do not disclose methods of use. As such, a method of solving the need for a universal illuminating system in the manner considered by this invention has not yet been disclosed.

A significant problem faced with many of the prior art solution as discussed above is accessibility and universality. There lacks a more universal visual aid system to assist with enhancing improved sight and navigation for safe pedestrian movement. Devices used in nocturnal spaces require some form of luminescence to assist in directing the user's line of sight. As such, this invention aims to solve this problem by providing a method and system for providing self-illuminated pathway and direction for guided movement that has broader universal application and accessibility in commerce.

BRIEF SUMMARY OF THE INVENTION

Note that all patents and applications referred herein are incorporated by reference in their entirety. Furthermore, where a definition or use of a term in a reference, which is incorporated by reference herein is inconsistent or contrary to the definition of that term provided herein, the definition of that term provided herein applies and the definition of the term in the reference does not apply.

Commercial offerings on guide tape solutions (also referenced interchangeably here as warning tapes) have comprised rolls of linear flexible sheets with adhesive backing and a top side having graphics that aid in visual warning. The construct of adhesive tape devices are generally described in the above referenced prior art. These devices have historically been designed for industrial purposes and traditionally by manufacturers from a product delivery perspective. Those products that have reached common retail outlets succeed in doing so primarily by access to distribution channels, which oftentimes is more the case for manufacturers delivering in-house products. The motivation behind common utility products such as these is more profit driven. As such, those readily available products such as warning tapes aim to maximize their relevance to the broader market with lesser emphasis on solving niche problems or even the actual problems that they were designed for. And due to the comparatively high cost of manufacturing those with photo-luminescent inks, areas of application of such material for the purposes outlined herein has not yet been properly explored. As a result, current commercial offerings of warning tapes are minimally effective while failing to solve core problems.

Movement through darkness or poorly lit areas have a degree of significant challenges. Primarily, for the human eye, accuracy in perception of depth or dimension is lost or altered when light is reduced. As a matter of culture, society would prefer to have their space be kept in relative darkness during the night time or during times of non-use for economic reasons of saving costs in utility services, as well as to maintain a diurnal pattern of lightness and darkness of the environment. Therefore, while some light may be employed to provide sufficient visibility to navigate through dark spaces in these times, the light that is employed is not meant to provide sufficient illumination to the surrounding area for accurate perception of depth and dimension. Devices such as small light bulbs used as night lights or self-illuminating mechanisms such as self-illumination tapes or plaques achieve the effect of being recognizable in the darkness and directing the human eye to a given location, but fails to provide necessary sense of depth or dimensional perception sufficient enough to enable safe movement there around. Safety would require a sufficient accuracy in perception. Given that minimal light is desired during night time period or period of non-use, the level of illumination capacity of small light bulbs and self-illumination material cannot enable the human eye to accurately perceive broader dimensional space in darkness. 3-D perception problems are often times greater in: emergency situations, evening outdoor environments, in underground facilities or basements. This is an inherent limitation in the current technology.

Existing products, particularly self-illumination tape, are designed with the intention of directing the human eye towards a particular location. The tape is positioned near the particular zone of danger or place that requires recognition. For example, at the edge of a step or the edge of a wall. Typically, multidimensional space becomes the most challenging because while the eye is directed to that location, the various dimensions are blended together into two dimensions when perceived in darkness. Commerce has failed to create a consistent system that overcomes this problem. Therefore, users will attempt to adopt existing technology in creative yet awkward ways to facilitate three-dimensional perception in darkness when using night time illumination mechanisms. In all such cases, as described further within the attached illustrations, these efforts fall short, only added more two-dimensional lighting to a flat two-dimensional dark space.

For example, current self-illuminating tapes have embedded repeating graphical shapes along their lengths. The graphical shapes may or may not be self-illuminating. For manufacturing and retail efficiencies and with consideration of other limitations pertaining to manufacturing, distribution, and retail movement of such products, they are typically formed in linear lengths and packaged in rolls. The user then extends the desired length of tape for a particular purpose. The visual effect of the tape is consistent along the entire length of the tape which enables the user to create a somewhat consistent environmental effect. As a consequence, a culture of use that has resulted from this style of product design is the ability and desire to create a relatively consistent visual environment based on the consistent design of the tape and its graphical content.

The consistent environment for which such devices are capable of creating has been dictated by manufacturing specification. Thus far, the devices comprise rolls of linear lengths of adhesive backed tape, wherein the top non-adhesive side typically having a graphic that is either singular or plural in nature. Those that have a plurality of graphical design will repeat those designs in a consistent alternating manner. This is so due to manufacturing constraints and standard die manufacturing processes established for printing on linear lengths of material. However, the capacity to create a greater consistent environmental effect by application of the design and construct of such devices has been rudimentary without further study or advancement. While current devices and designs do function as intended in terms of creating visual markings for the location attached, they provide minimal dimensional assistance particularly for poorly lit areas. There has been a lack of effort in the industry to transcend beyond the mere effect of marking into realms of dimensional marking of dark spaces which would otherwise address biological factors pertaining to human optical limitations in such environments. Problem solving in this realm fails to utilize human factors engineering or ergonomic science-based knowledge, which is reflected in the inadequacy of existing products in the market.

The invention herein relates to a system and method for creating a consistent three-dimensional visual aid for traversing poorly lit or dark spaces by utilizing a device that creates three-dimensional marking with an intuitive and consistent communicative pattern of marking design. The device further containing either self-illuminating material, light reflective material, or a combination of both.

The system and device of this invention comprising a length of linear thin flexible material. Said material may comprise thin sheets of paper, fabric, plastic, or combinations thereof, or any equivalent style of material that may achieve the same purpose of the device, method and system disclosed herein. Said linear thin flexible material having two side edges, a first and second terminal edge, a top surface and a bottom surface, and a length. Said bottom surface may or may not have adhesive material attached thereto. Should the bottom surface have an adhesive ability with adhesive material attached thereto, then an additional sheet of thin flexible material (e.g. clear non-skid) is attached overtop said adhesive material of said bottom surface to provide protective barrier to said bottom surface but is easily removable from said bottom surface without negating the adhesive quality of the adhesive material. Said bottom surface may alternatively be capable of adhesion by static manner and would comprise material content within the bottom surface to enable static manner of adhesion (also referred to within industry practices as non-skid material or static-cling material, either of which may overlap in their common physical and functional qualities but not necessarily be identical or interchangable). Said bottom surface may alternatively be non-bonding in nature such that it's attachment to hard surfaces would be by the user's design.

Said top surface having a visually recognizable feature by manner of color, pattern, reflective and or self-illuminating qualities. Said top surface providing a consistent and intuitive marking system visually communicative of dimensional space to an observer. Said consistent and intuitive marking that visually communicates dimensional space comprising one or more patterns, each pattern of said one or more patterns having at least one or more lines that forms each of its edges. Each said one or more lines positioned at least three or more distinctive angles relative to each other. Each said lines of said one or more lines having a first and second end such that their each respective first and second ends converge towards another said first or second end to form a shape. The linear edge of the flexible linear sheet comprising a line with its own relative angle if said linear edge of said flexible linear sheet functions to form a terminal edge of said shape. Said lines of said shape may comprise curved, angular, or linear features or any combination of these three types of features. Said shape having a central apex point. Said central apex point comprising the highest point on any of either a curved, linear, or angular feature of said shape. Said apex point of said shape pointing towards the center or the right or left side edges of said linear flexible material. The area between the interconnected lines creating an internal space. The area external to the interconnected lines creating an external space. The internal space having a color different from the external space. Said shape is repeated along the length of said linear flexible material with repeating equal distanced space therebetween.

The material composition of the top surface of the device of this invention comprising a durable thin flexible sheet of material preferably having a non-skid or non-slip surface. Said non-skid or non-slip surface may be achieved by lamination of an additional layer of clear material having the desirable non-skid or non-slip texture composition. Said non-skid or non-slip texture composition may be smooth in nature or non-smooth (i.e. rough, bumpy, etc.) Said lamination layer to said top surface is preferably permanently affixed to the device and is sufficiently clear to enable visual perception of the colored design images and shapes presented there below to enable the intended effect of this invention. The design images in the form of shapes are added to the top surface of this device (which essentially is the reverse side of the bottom surface of this device) by manner of mechanical printing of liquified pigment. Such liquified pigment may be various types of liquid or gel inks or alternatively luminescent material in liquid, gel, or semi-liquid form. The device upon completed assembly will comprise a thin sheet of durable flexible material having a bottom surface and top surface, said bottom surface may have adhesive capability but not necessarily so for purposes of this invention, said top surface having design images in the form of shapes as described herein, said shapes further containing self-illuminating material and having self-illuminating ability, said top surface having a non-skid or non-slip texture. The material composition of said thin flexible material of this device may be any variety of plastic, paper (of any type of organic pulp material), fabric (either or both synthetic or organic fabric material), organic or inorganic fibrous material, or any combinations thereof.

The system of this invention comprising the following application of said device. A device as described above such that the shape formed on the top surface of said linear flexible material having sides that point in at least three different angular directions which converge and form an apex point, said apex point directed towards either the center or the right or left side edges of said linear flexible material. This pattern repeating itself along the length of said linear flexible material between its top and bottom edges. Said pattern comprising a plurality of said shape, said plurality of said shape comprising the same shape and dimension, said pattern further comprising the external space between each shape of said plurality of shapes such that the space between each said shape is repeated in consistent manner along the length of said linear flexible tape as well. The apex point of each said shape is consistently directed towards the same location on said linear flexible tape (either center or right or left side edges). Said three or more distinctive angular projections of said edge of each said shape provides multi-dimensional directional perspective to the viewer. When it is placed on a single planar surface, each angular vector of the side edge of said shape will extend a certain distance into a particular direction. If the shape comprises three angular vectors, then the viewer will perceive space into three different regions and therefore is able to intuitively and cognitively process depth of space subconsciously. The more angular vector information is provided, the greater ability of the viewer to subconsciously perceive and assess depth of space from the additional visible dimensions. Essentially, each angular vector that is visible through darkness creates a new angle of dimension that is perceivable in an otherwise two-dimensional contrast between black and white (or dark and light) space.

Note that use of the term depth within the context of this invention comprises the notion of a shape having at least three or more angles, each angle directed towards different vector trajectories. A triangular shape would have only three angular vector trajectories while a circle or half circle (or any rounded shape) may have near infinite amount of angular vector trajectories forming its shape. It is possible that the shape would have multiple linear sides (more than two) and yet be comprised of solely two angular vector trajectories, as in the case with parallelograms, squares, rectangles, etc., which would not qualify within the scope of the claimed invention herein.

It is understood and commonly experienced in the realm of marking tapes used in dark spaces that those tapes with two-dimensional graphics (having shapes that comprise only two angular vector trajectories) will tend to blend into the dark space in a flat two-dimensional manner, resulting in the viewer recognizing the location that is marked but not recognizing the level of depth surrounding that space. By having both elements of a third angular vector and a central apex point that points towards a certain direction, the viewer is able to understand the dark space in between the bright space in relative manner with added dimension. Essentially, the visible shapes (via self-illuminating material) serve to create an outline in the dark space of the unlit room (interchangeably referred to as the negative space), which gives shape to the dark space or negative space therebetween. Note that either the shape as described herein, or the space therebetween in its repeated pattern along the length of said linear flexible material may be self-illuminating or reflective in nature. Note also that the shape as described herein forms the primary shape of this invention. However, the repeating space therebetween also forms a shape of its own and may be subject to the same dimensional and parameter rules described for the primary shape of this invention and having the same effect as described and intended for the primary shape of this invention. Such that the secondary shape of the negative space between the primary shape of this invention may be the portion of the invention composed of self-illuminating and material and functioning to create a multi-dimensional effect on dark surfaces that the invention is attached to. It is further possible, as an alternative embodiment of the invention described herein, that the negative space forms a secondary shape that is simply the inverse or mirror image of the primary shape.

The functional effect of this invention provides that the dark space of a dark surface is outlined by the bisecting effect of the shape of this invention across its horizontal path (i.e. bisecting the high contrasting front horizontal edge of each step of a flight of stairs). The bisecting outline of the dark space is achieved by the apex point of the shape pointing along a bisecting direction. The apex point of the shape of this device essentially following the vector trajectory of the actual depth of the concerning space, creating additional dimensional perception and information. Contrast this to existing art which simply provides linear shapes along the length of a linear tape. When positioned along the horizontal path of the concerning space (along the horizontal edge of each stair of a flight of stairs), only two dimensional linear and horizontal shapes are perceived in a flat two-dimensional manner with no additional information regarding the depth of the concerning space. Without additional dimensional information, additional dimensions in space cannot be perceived.

The system described herein comprising a linear flexible sheet of material as provided above having embedded within its top surface a shape as described above as well, said shape is repeated along the length of said linear flexible sheet of material with a space therebetween, said space also consistently repeated along the length of said linear flexible sheet of material. The apex point of said shape pointing towards at least the center or a left or right side edge of said linear flexible sheet of material. Said linear flexible sheet of material is positionable along the length of a linear surface such that said shape between its apex point and the rear side of said apex point (between the left and right side edges of said linear flexible sheet of material) bisects the length of said linear surface, creating an additional visible angular element along a different angular trajectory than the existing angular shapes of the linear surface such that said visible angular element may be perceived by an observer in a dark or poorly lit space. And such that the dark space of said linear surface in an unlit room being contrasted by said shape of this invention will embody a new shape of its own that has more than two common angles. Wherein said dark space is highlighted by the self-reflective shape of this invention and embodied in three or more angular perspectives.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein. Detailed descriptions of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Embodiments of the invention are discussed herein with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be understood that any exact measurements, dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Reference will now be made in detail to exemplary aspects of the present invention which are illustrated in the accompanying drawings. Wherever possible, the same reference numbers will be used throughout the drawings to refer to the same or like parts.

Figure 1:
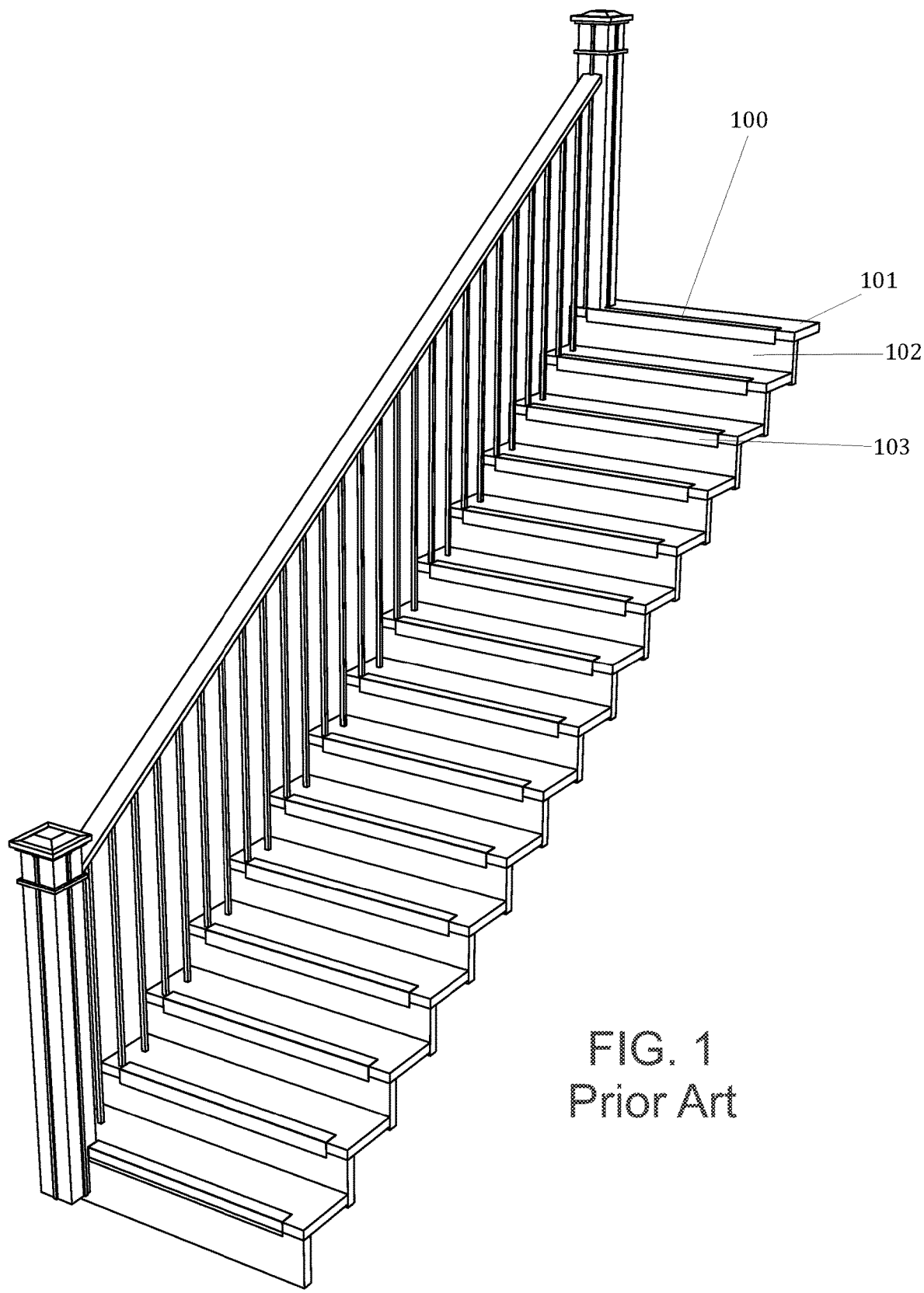
FIG. 1 is a partial side perspective view of the prior art.

FIG. 1 provides an exemplary illustration of the existing prior art comprising a linear sheet of marking tape 100, attached to the top 101 and side 102 terminating edge surfaces of steps of a staircase. Said linear sheet of marking tape 100 of the prior art as exemplified here having a singular design element, which comprises a singular solid continuous scheme of color without graphical relief 103. As such, when positioned in a multi-dimensional space within a dark or poorly lit area where there is a lack of other dimensional referential elements (color, size, depth, shapes, etc.) and where the primary dimensional elements available to the viewer is a contrast of light and dark space, then this piece of prior art which comprises a two-vector shape (rectangular shape and parallelogram) will not provide additional dimensional reference. The viewer will still struggle as they had before even in spite of the illumination from the tape, because what is lacking is additional dimensional reference to provide an honest perception of depth. In situations like this, the viewer will have to consciously manufacture their own imagined sense of depth within such spaces, which would be inconsistent between individuals, untrue to the actual dimension of that space, unreliable, and dangerous. As such, FIG. 1 illustrates the failures of existing art within this industry, highlighting the lack of accurate identification of the human related problem in these scenarios and failure to properly problem solve by use of human factors engineering or ergonomic science-based knowledge.

Figure 2:
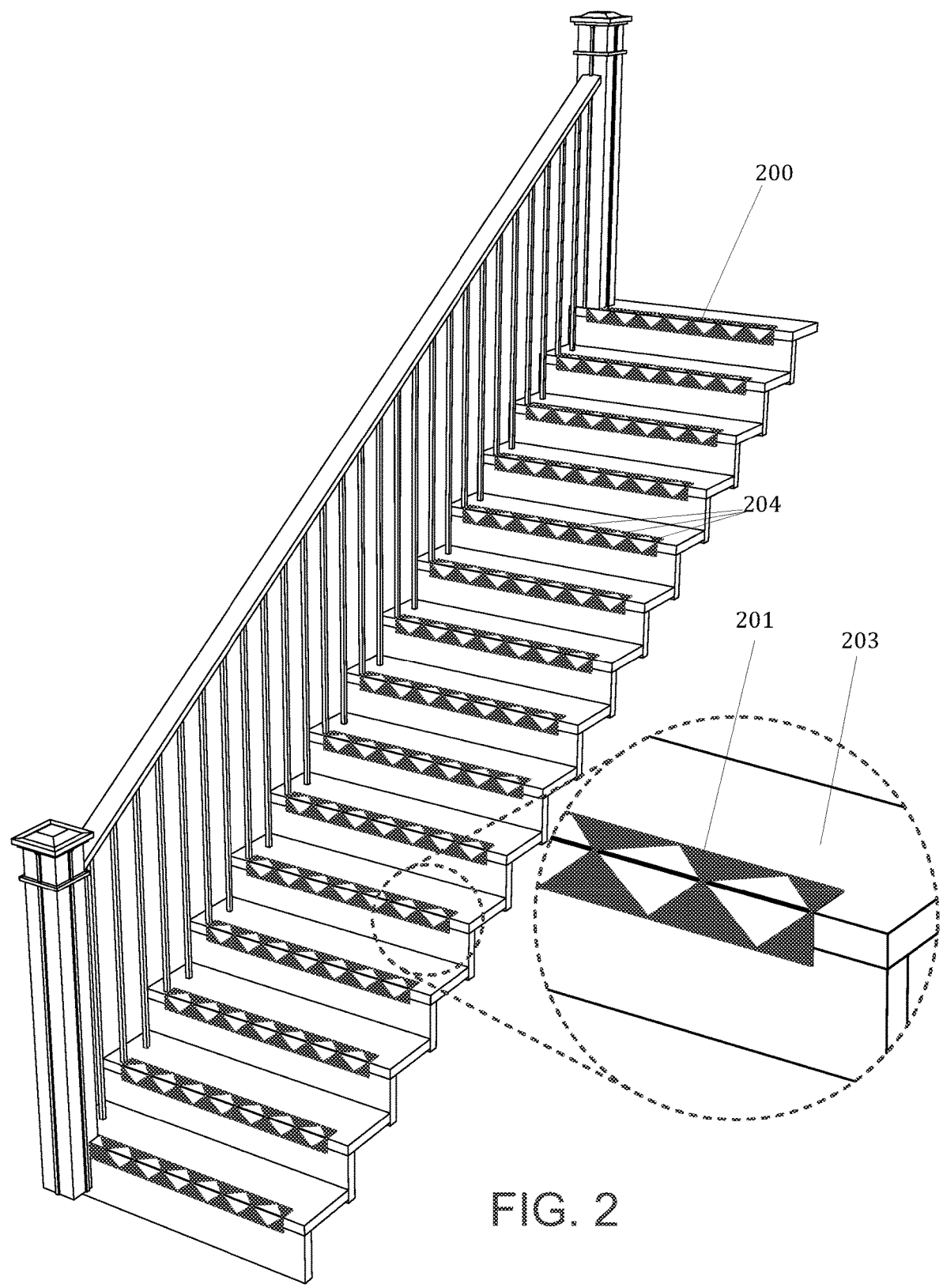
FIG. 2 is a partial side and front perspective view of a preferred embodiment of the device and system of this invention.
Figure 3:
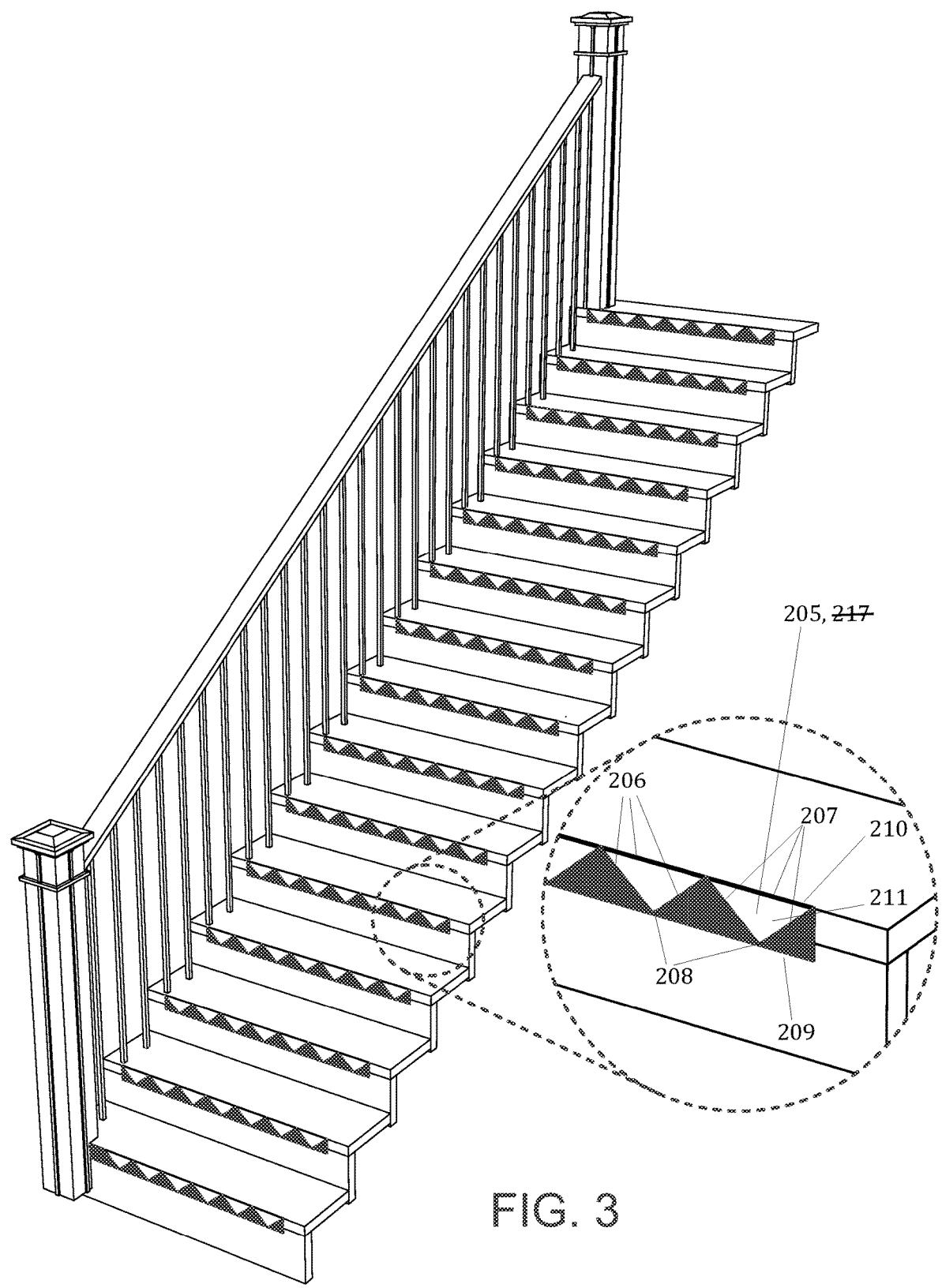
FIG. 3 is a partial side and front perspective view of an alternative embodiment of the device and system of this invention.
Figure 4:
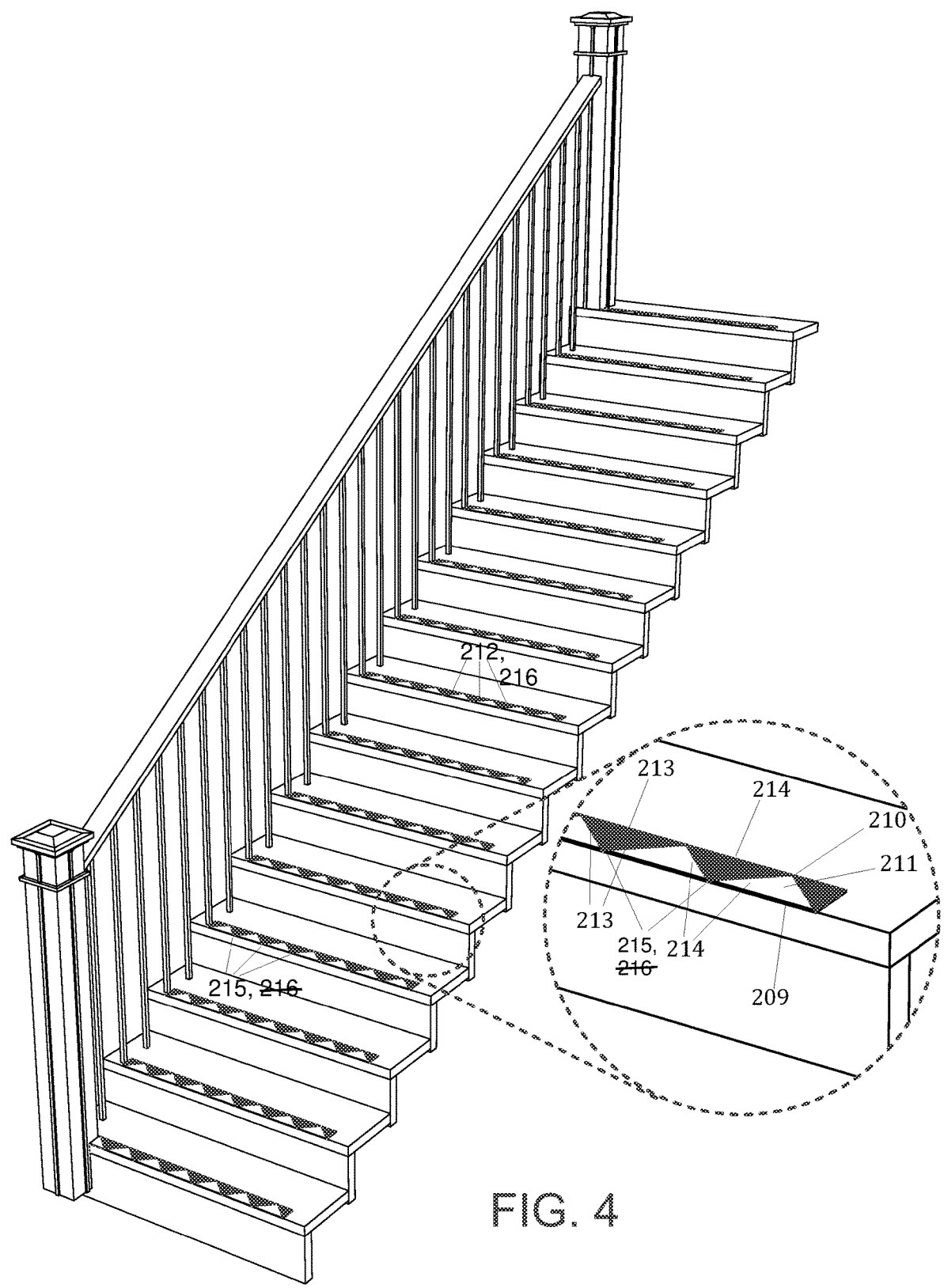
FIG. 4 is a partial side and front perspective view of an alternative embodiment of the device and system of this invention.

FIGS. 2, 3, and 4 provide a perspective view of an exemplary illustration of an embodiment of this invention. According to this embodiment of the invention, the device comprises a linear sheet of flexible material 200 having a top surface 201 and bottom surface 202 (which is the reverse side of the top surface, but not shown and hidden from view in the referenced figures due to their position relative to the portrayed environment). Said bottom surface 202 being attachable to another surface 203 in affixed manner. Said bottom surface 202 is attachable to another surface by chemical adhesion, static adhesion, or by manner of viscous tension. Said linear sheet of flexible material 200 may alternatively not have adhesive capability on its back surface 202 and may alternatively be attachable to a surface by manner of containment within a plate, said plate being affixed to said surface while revealing the top surface 201 of this device.

Said top surface 200 of said device 200 of this invention as illustrated within FIGS. 2, 3, and 4 comprising a planar surface having a multi-dimensional pattern 204, wherein said multi-dimensional pattern having therein or containing reflective element, self-illuminating element, or a combination of both such elements. Said self-illuminating element comprising photo-luminescent material, phosphorescent material, fluorescent material, bioluminescent material, or any type of luminescent material that may be captured in pigment form with renewable luminescent ability without reliance on an external energy source.

Said multi-dimensional pattern 204 as illustrated within the preferred embodiment of FIGS. 2, 3, and 4 comprising a primary shape 205 having more than one side edge 206, each side edge embodying at least one angular vector trajectory 207. Said primary shape 205 comprising a total of three or more angular vector trajectories 207 wherein at least two or more such angular trajectories 207 of said one or more side edge 206 converge to create an apex point 208. Said primary shape 205 may have more angular vector trajectories 207 than it may have in total side edges 206. For example, a curved (e.g. semi-circle) shape 205 will have a multitude of angular vector trajectories 207, a single side edge 206, and a single apex point 208. Said apex point 208 is directed towards either a left 209 or right 210 side or center 211 of said linear sheet of flexible material 200. Two or more of each said primary shape 205 is positioned adjacently to each other thereon the top surface 201 of said thin linear sheet of flexible material 200 with a space 212 therebetween. Each said primary shape 205 of said two more shapes and the space 212 therebetween repeating along the length of said thin linear sheet of flexible material 200. Said side edge 206 of said shape 200 may coincide with the same side edge 209, 210 of said thin sheet of linear flexible material 200.

Said space 212 between each said primary shape 205 also forming a secondary shape 216 of this invention. Note that reference number 212 refers to said space between the above referenced primary shapes and reference number 216 more specifically identifying the secondary shape formed by the space between said primary shapes. Said secondary shape 212, 216 also conforming with the limitations of the primary shape 205. Said secondary shape 212, 216 as well having more than one side edge 213, each side edge 213 embodying at least one angular vector trajectory 214. Said secondary shape 212, 216 comprising a total of three or more angular vector trajectories 214 wherein at least two or more said angular trajectories 214 of said one or more side edge 213 converge to create an apex point 215. Said apex point 215 directed in the direction towards either a left 209 or right side 210 or center 211 of said linear sheet of flexible material 200. Two or more of each said secondary 212, 216 is positioned adjacently to each other thereon the top surface 201 of said thin linear sheet of flexible material 200 with the primary shape 205, comprising the space therebetween. Each said primary shape 205 of said two or more primary shapes 205 and each said secondary shape 212, 216 of said two or more secondary shapes 212, 216 repeating along the length of said thin linear sheet of flexible material 200 in alternating manner.

Figure 5:
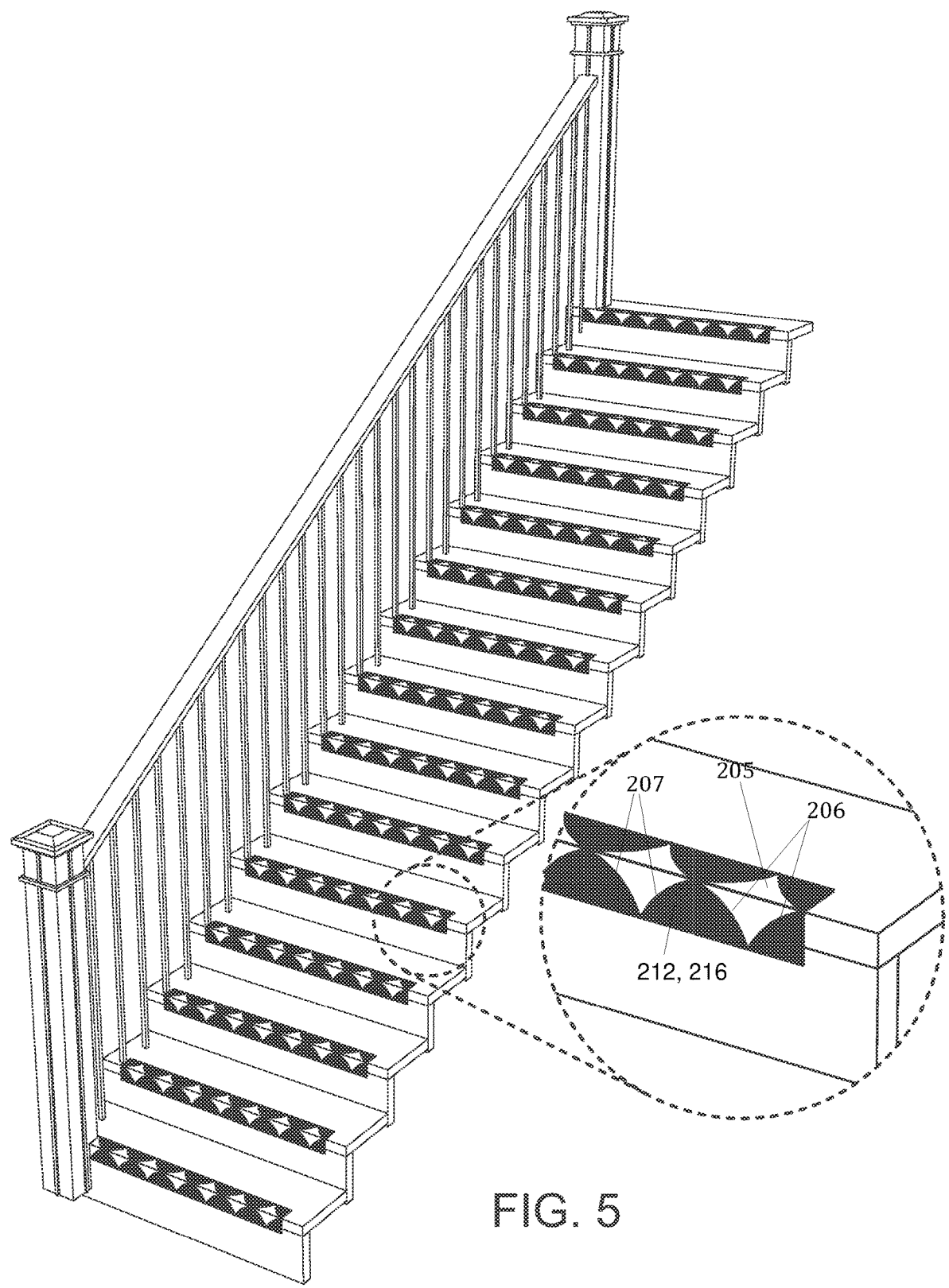
FIG. 5 is a partial side and front perspective view of an alternative embodiment of the device and system of this invention.
Figure 6:
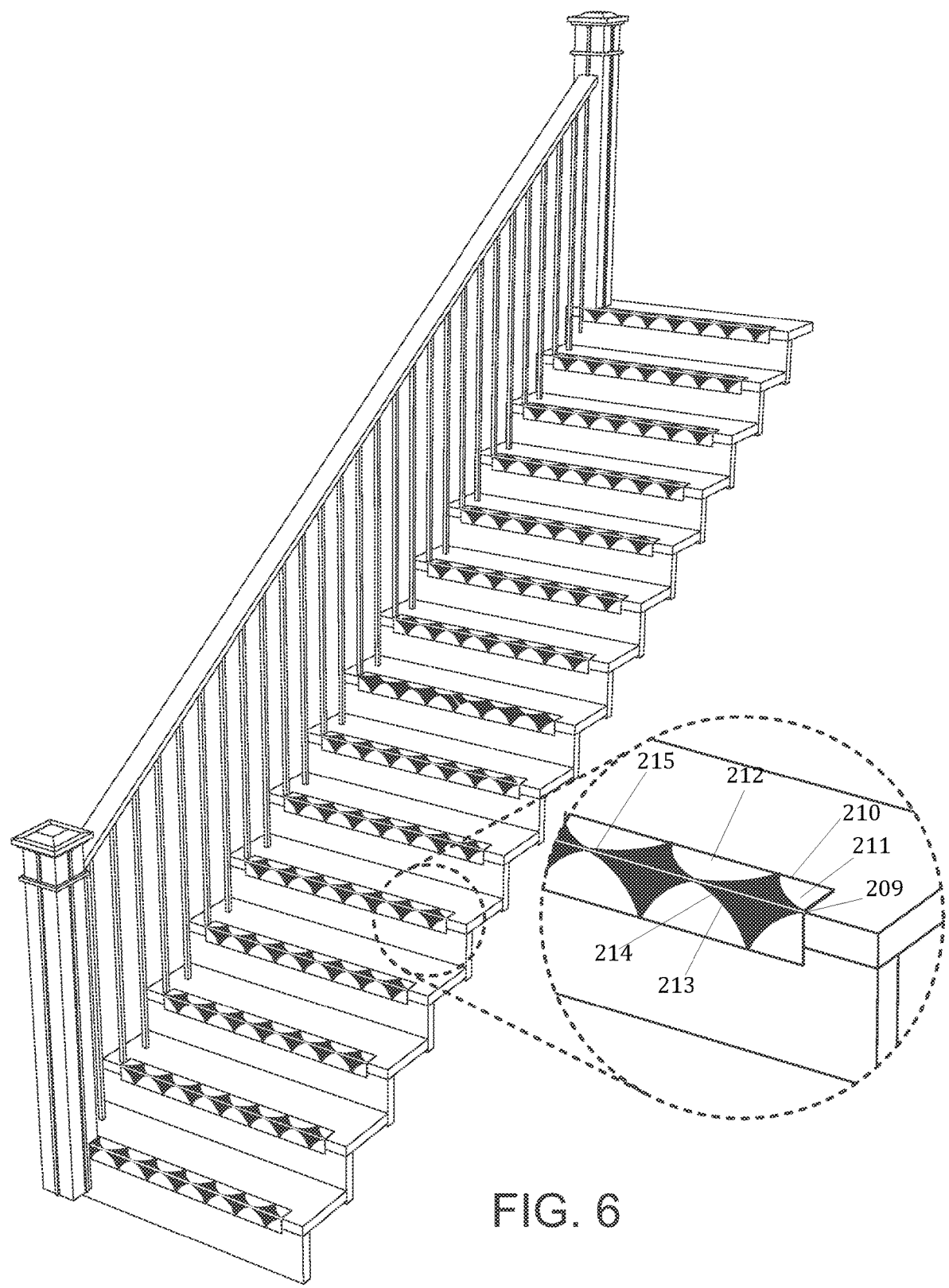
FIG. 6 is a partial side and front perspective view of an alternative embodiment of the device and system of this invention.

Either the primary shape 205 or the secondary shape 212, 216 may comprise self-illuminating material but both cannot contain the same color of self-illuminating material in adjacently positioned manner due to the fact that the same color of self-illuminating material will blend together to lose the graphical dimensional effect of either primary shapes 205 or secondary shapes 212, 216. Said primary shapes 205 and secondary shapes 212, 216 may both contain self-illuminating material if the color of such material is distinctively different to create a visual contrast between either said primary shapes 205 and secondary shapes 212, 216. This aspect of the invention is exemplified in an alternative embodiment presented in FIGS. 5 and 6, which shows the same primary shapes 205 and secondary shapes 212, 216 being visually contrastable from the other by self-illuminating material contained in either said primary shape 205 or secondary shape 212, 216. The lighter colored shape in FIGS. 5 and 6 representing self-illuminating properties while the black color representing the lack of self-illuminating properties.

Figure 7:
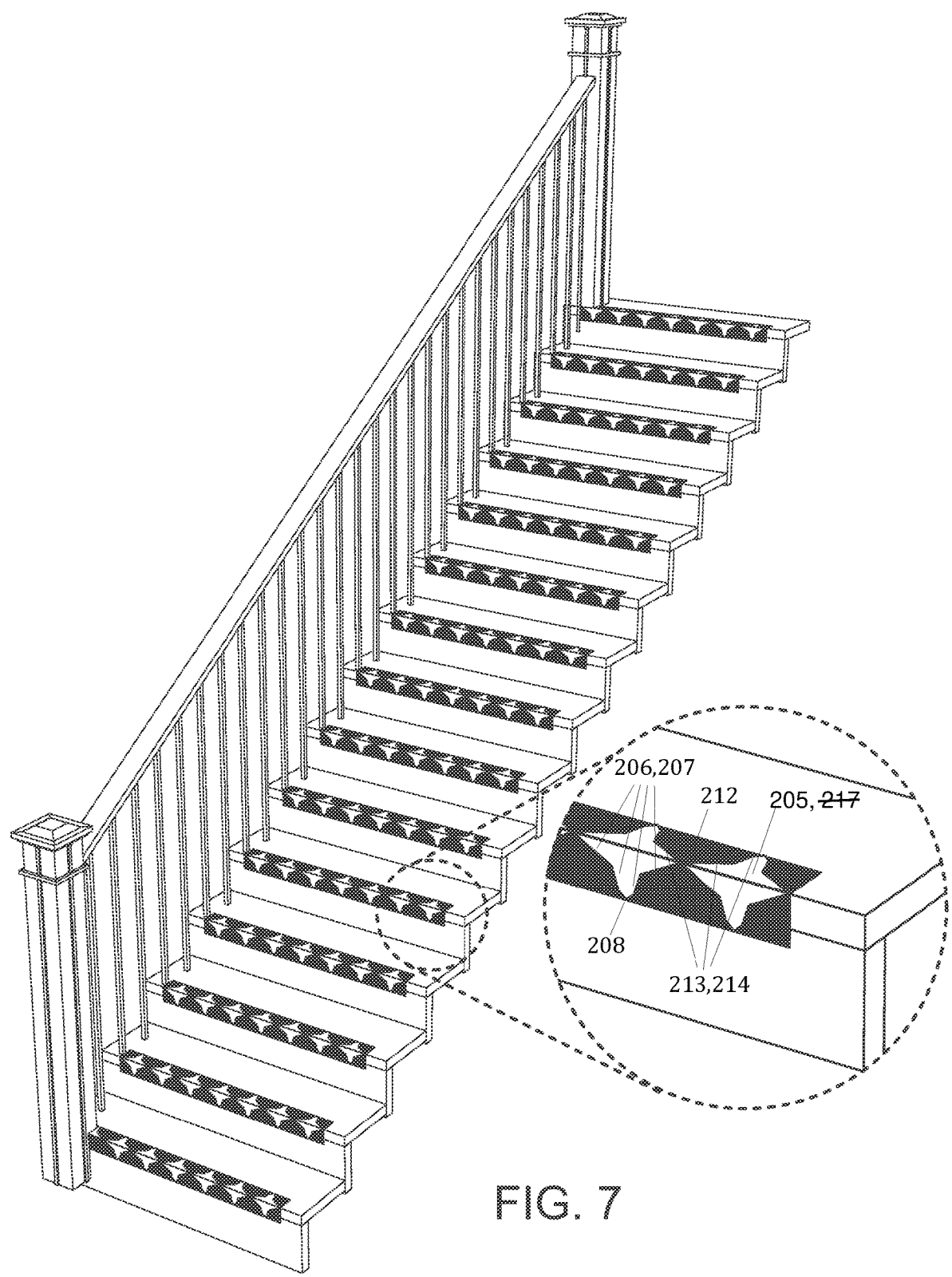
FIG. 7 is a partial side and front perspective view of an alternative embodiment of the device and system of this invention.

FIG. 7 provides yet another alternative embodiment of this invention. The primary shapes 205 and secondary shapes 212, 216 illustrated within FIG. 7 captures yet another design feature comprising the same limitations as provided above. Both primary shapes 205 and secondary shapes 212, 216 in this case having more than one side edge 206, 213, each side edge 206 embodying at least one angular vector trajectory 207, 214. Said primary shapes and secondary shapes 205, 216 comprising a total of three or more angular vector trajectories 207, 214 wherein at least two or more such angular trajectories 207, 214 of said one or more side edge 206, 213 converge to create an apex point 208, 215. Said apex point 208, 215 is directed towards either a left 209, or right side 210 or center 211 of said linear sheet of flexible material 200. Two or more of each said primary shapes 205 or secondary shapes 212, 216 are positioned adjacent to each other thereon the top surface 201 of said thin linear sheet of flexible material 200 with a space therebetween (filled by either the primary shape 205 or the secondary shape 212, 216). Each said primary shape 205 or secondary shape 212, 216 of said two more of such shapes of the identical kind and the space therebetween (filled by either the primary shape 205 or secondary shape 212, 216) repeating along the length of said thin linear sheet of flexible material 200. Said side edge 206, 213 of said primary shapes 205 or secondary shapes 212, 216 may coincide with the same side edge 209, 210 of said thing sheet of linear flexible material 200.

A system for marking dark or poorly lit space comprising a linear sheet of flexible material 200 with a top 201 and bottom surface 202 wherein said bottom surface is attachable to a surface 203 where marking is needed. Said top surface 201 containing a plurality of multi-dimensional shapes 204 subject to the limitations described above for the device of this invention. Said system of this invention comprising the device as described above, wherein said device is attachable to a surface in need of marking 203, said surface in need of marking 203 being adjacently surrounded by other surfaces having different depths or dimensions from the desired surface for marking. One or more of said linear sheet of flexible material 200 of this invention positioned linearly at a location on said desired surface to provide additional dimensional perception of depth from the visual outline of said self-illuminated primary or secondary shape under dark condition. Said primary shape 205 or secondary shape 212, 216 adding at least a third dimension to an otherwise dark two-dimensional space. This system provides visual information to the viewer of multi-dimensional depth of space that is otherwise absent in a mere contrast of dark and light. Each linear sheet of flexible material 200 of this invention may be positioned immediately adjacent to each other such that their each primary shapes 205 and secondary shapes 212, 216 align to create a greater multi-dimensional affect. For example, FIG. 6 demonstrates the secondary shape 212, 216 comprising a semi-circle containing self-illuminating material such that two sheets of such devices 200 are positioned immediately adjacent to each other in parallel manner but where the apex 208, 215 of the semi-circle shape 212, 216 of each sheet of tape 200 is facing the other to create a "pinching" visual affect along the terminating edge 209, 210 of each step of a staircase. A pedestrian who may be traversing a dark space and along such a staircase would be accurately informed as to the location of the terminating edge of a step of a staircase. Contrast the effect of FIG. 6 to the effect of FIG. 1, which in the dark would look like a two-dimensional flat rectangular bar, providing no actual or accurate information as to where the edge of each step terminates.

Having fully described at least one embodiment of the present invention, other equivalent or alternative methods according to the present invention will be apparent to those skilled in the art. The invention has been described by way of summary, detailed description and illustration. The specific embodiments disclosed in the above drawings are not intended to be limiting. Implementations of the present invention with various different configurations are contemplated as within the scope of the present invention. The invention is thus to cover all modifications, equivalents, and alternatives falling within the spirit and scope of the following claims.

The invention claimed is:

1. A marking device comprising
a length of thin linear material,
said thin linear material having two sides that comprise the length of said marking device and two sides that form the width of said marking device, a top surface and a bottom surface,
said marking device is further visually noticeable by one or more repeatable shapes disposed on said thin linear material,
said one or more repeatable shapes further having reflective or self-illuminating qualities,
said one or more repeatable shapes conveying three-dimensional spatial information in the form of visual cues as follows,
each said one or more repeatable shape comprising three sides,
each side of said three sides disposed at distinctive angles from each other,
said three sides comprising two or more sides that connect to form an apex point,
said apex point pointing towards the side of said marking device that defines its said length,
each said one or more repeatable shape having a visually recognizable internal space,
the space between each of said one or more repeatable shape that are adjacently positioned forming a secondary shape having its own internal space,
each said one or more repeatable shape and each said secondary shape is repeated in alternating sequence along the length,
said internal space of either said one or more repeatable shape or each secondary shape is filled with light reflecting material, self-illuminating material, or combinations thereof such that either each said one or more repeatable shape or said secondary shape is reflective or self-illuminating in alternate manner to create a visual contrast between each other.

2. The marking device of claim 1 wherein at least one side of said three sides of said one or more repeatable shape comprising one side of said marking device that defines its said length.

3. The marking device of claim 1 wherein said thin linear material is flexible.

4. The marking device of claim 1 wherein said thin linear material is comprised of plastic material, organic or inorganic fibrous material, or any combinations thereof.

* * * * *